United States Patent Office 2,708,736
Patented May 17, 1955

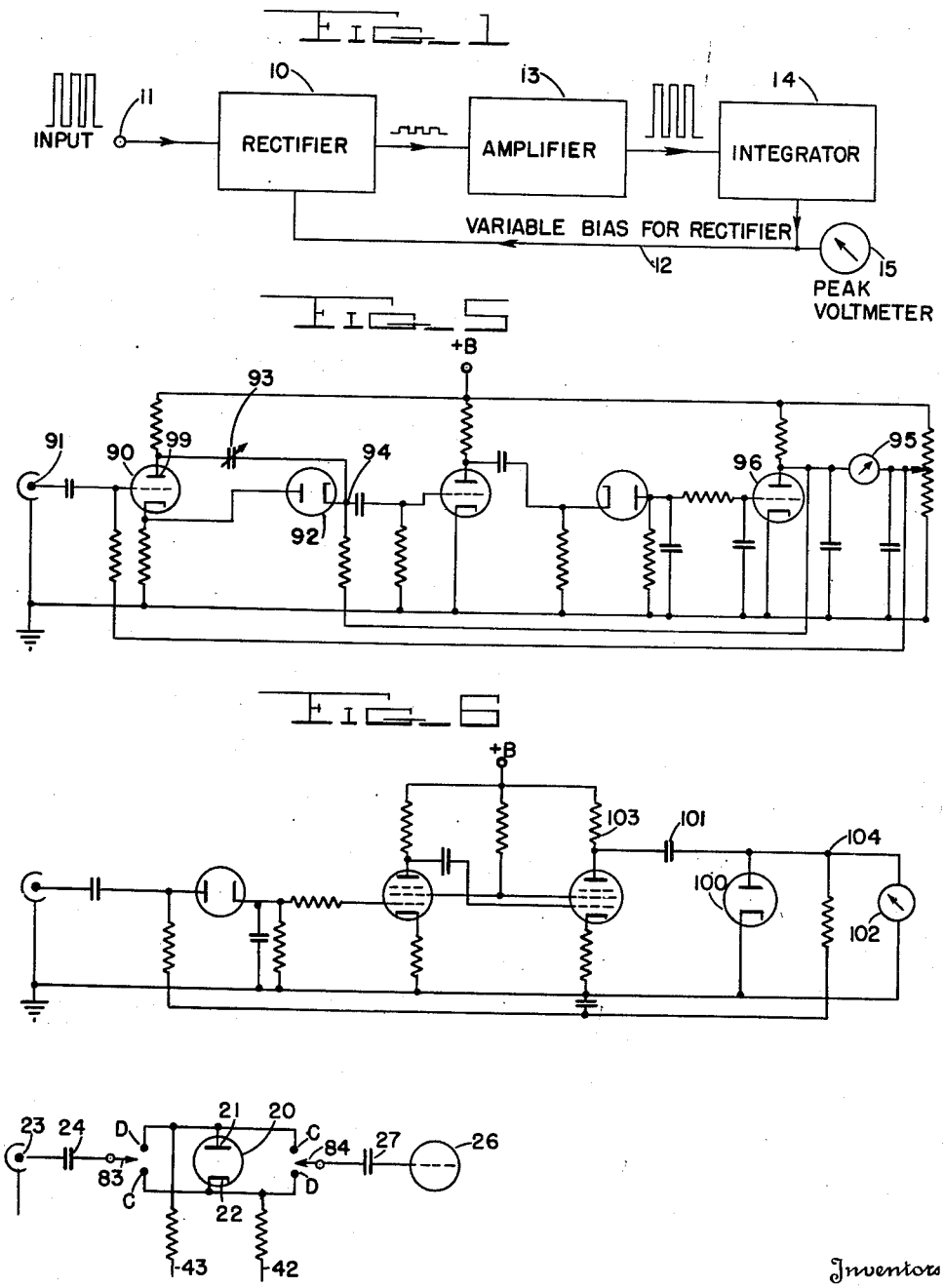

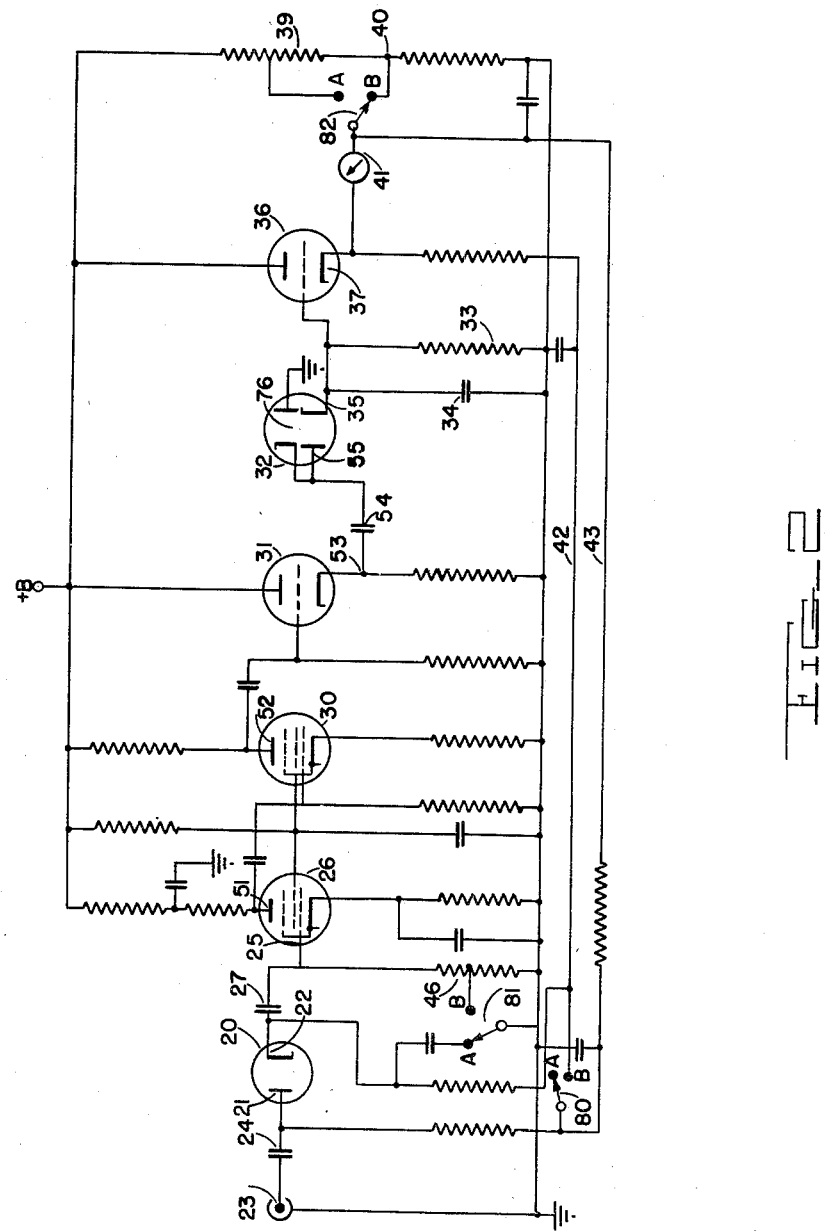

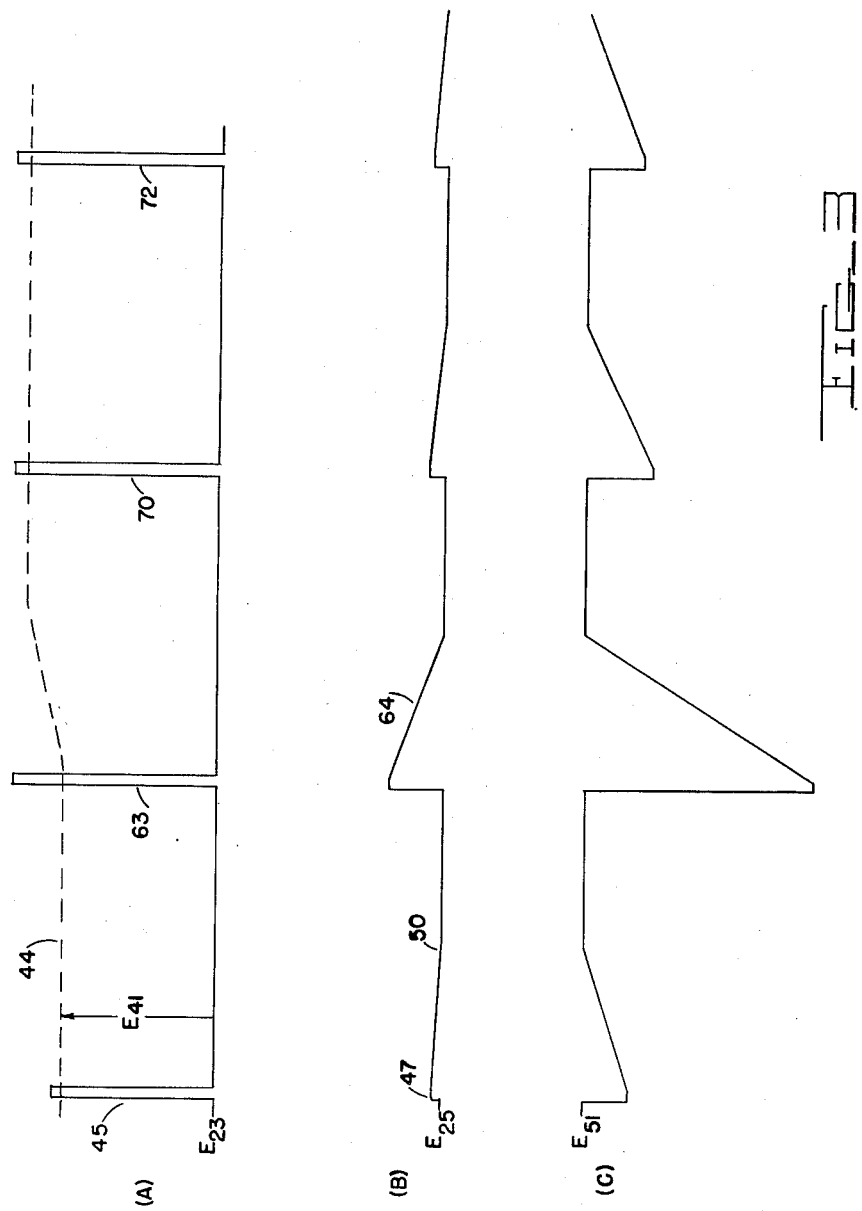

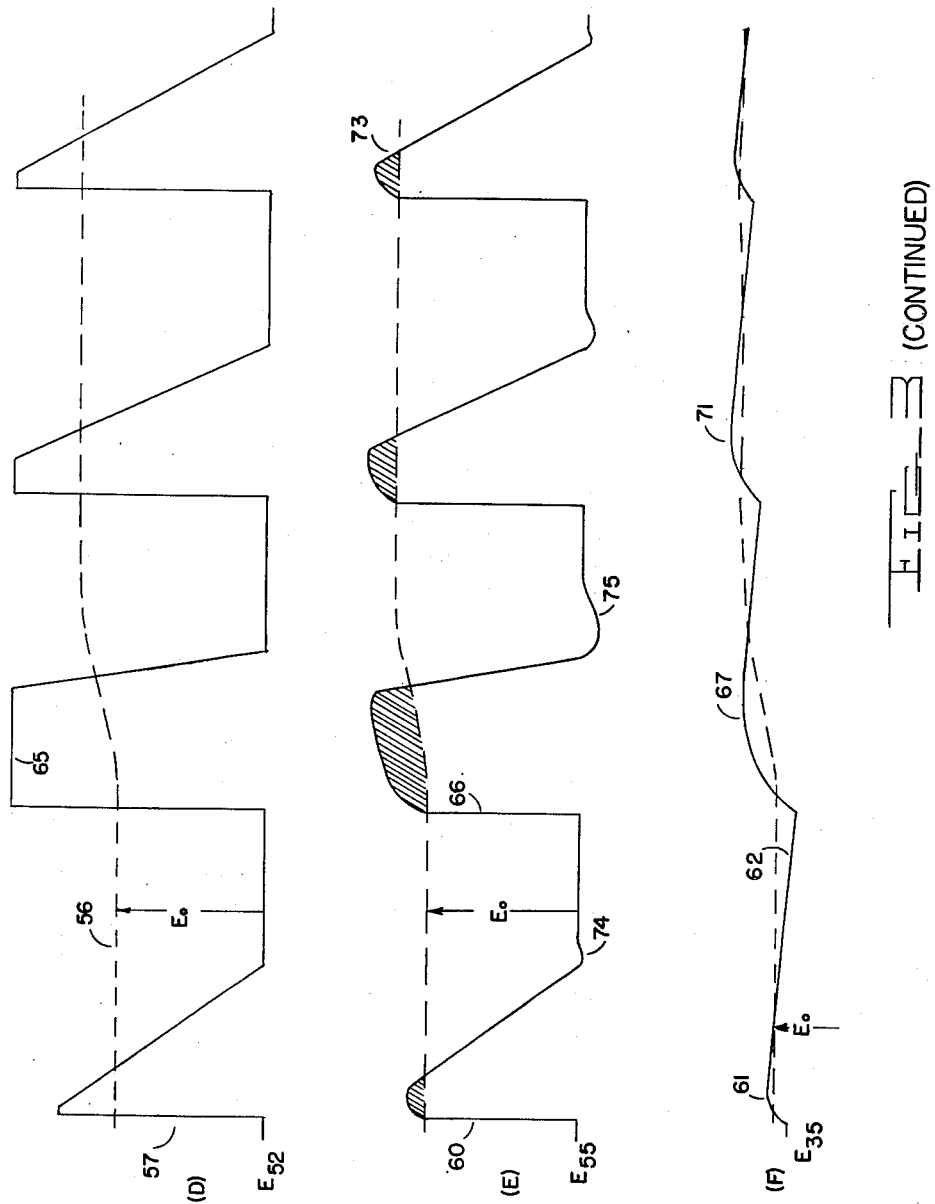

2,708,736

PEAK VOLTMETER

Cyrus J. Creveling, United States Army, and Leonard Mautner, Arlington, Va., assignors, by direct and mesne assignments, to the United States of America as represented by the Secretary of the Navy Application September 27, 1945, Serial No. 618,974

4 Claims. (Cl. 324—103)

This invention relates to a circuit for deriving a unidirectional voltage which varies directly with the peak voltage of a periodically repeated signal.

Under certain conditions it is desirable to know the peak voltage of a periodically repeated signal regardless of the wave form of the signal. Voltmeters are well known in the art which gives the root mean square voltage of a periodically repeated signal, defined as that voltage which if applied continuously would produce the same power flow as the periodic voltage under consideration. When the voltage being measured has a regular, predetermined waveform, such as a sine wave, the peak voltage has a predetermined relation to the root mean square value of the voltage as measured by prior art means.

However, for periodically repeated signals of irregular waveform, or of varying periodicity, the root mean square value of the voltage bears no predetermined relation to the peak value of the voltage.

Accordingly it is an object of this invention to produce a circuit by which the peak voltage of a periodically repeated signal may be measured.

It is another object of this invention to produce a circuit from which may be derived a substantially constant voltage which is a direct function of the peak voltage of the signal applied to the voltmeter.

It is a still further object to produce a voltmeter circuit in which a periodically repeated signal is applied to a biased rectifier, the spill-over signal from the rectifier is amplified and integrated, and the integrated voltage applied back to the rectifier to control the bias thereon.

Pursuant to these objects and with further objects which will become apparent in this specification, this invention will now be described with reference to the accompanying drawings in which;

Fig. 1 represents in block diagram form one embodiment of this invention;

Fig. 2 illustrates a particular circuit meeting the general description outlined in Fig. 1;

Fig. 3 depicts certain voltage waveforms existing throughout the circuit of Fig. 2;

Fig. 4 illustrates a modification applicable to a portion of the circuit of Fig. 2;

Fig. 5 illustrates a circuit embodying another form of this invention; and

Fig. 6 illustrates still another embodiment of this invention.

Referring to Fig. 1, this invention comprises the combination of a rectifier 10 to which may be applied at input terminal 11 a voltage of any periodically repeated waveform. Between the terminals of rectifier 10, is applied a substantially constant direct voltage constituting a rectifier bias. This bias, illustrated at 12, is fed from another portion of the circuit to be described below. The peaks of the signal voltage applied to rectifier 10 through terminal 11 will "spill-over" above the rectifier bias. The spill over voltage will be amplified in amplifier 13 and then will be integrated by some form of energy storage circuit in integrator 14.

At the output terminal of integrator 14 will appear a substantially constant voltage, the magnitude of which will vary directly with the amount of spill-over voltage from rectifier 10. This substantially constant voltage, applied back to rectifier 10 as a variable bias 12, will be of magnitude approximately equal to the peak voltage of the periodically repeated signal applied to input terminal 11. Therefore, by means of a D. C. voltmeter 15, the peak voltage of the input signal may be determined.

The operation of the circuit of Fig. 1 now becomes manifest; when the spill-over voltage appearing at the output of rectifier 10 increases, more energy will be fed to integrator 14, raising the voltage output from integrator 14 to a value substantially equal to the peak voltage of the input applied at terminal 11. This voltage will promptly raise the bias on rectifier 10, thereby decreasing, and thus stabilizing, the spill-over signal at the output of rectifier 10.

A particular circuit embodying the principles above enunciated will be found in Fig. 2, wherein a rectifier 20, shown in this case as a tube having anode 21 and cathode 22, constitutes the biased rectifier corresponding to 10 in Fig. 1. Input signals are applied to the rectifier at terminal 23 through coupling capacitor 24; and the voltage spilling over above the rectifier bias will be applied to grid 25 of amplifying tube 26 through coupling capacitor 27. Further amplification will take place in amplifying tube 30, the output of which is applied through a cathode follower tube 31 to a second rectifier 32. Output from rectifier 32 is applied to a parallel connected RC circuit consisting or resistor 33 and capacitor 34. The substantially constant voltage appearing at cathode 35 of rectifier 32 is applied to a cathode follower 36. The voltage appearing at cathode 37 is measured, with respect to a predetermined point 40 on a potentiometer 39, by a voltmeter 41. The voltage measured in voltmeter 41 is also applied through leads 42 and 43 to cathode 22 and anode 21, respectively, of rectifier 20.

The operation of the circuit of Fig. 2 will best be understood by reference to the waveforms of Fig. 3 wherein (A) represents a periodically repeated signal applied to input terminal 23. Inasmuch as the circuit of Fig. 2 is particularly suited for measuring peak voltage of pulses, the waveform at (A) has been shown as a series of periodically repeated, short pulses. At the start of the action illustrated in (A), rectifier 20 is assumed to be already biased to a substantially constant voltage, represented by dotted line 44 and equal in this case to the voltmeter reading $E_{41}$ of the voltmeter 41. Therefore, no signal will appear upon cathode 22 of rectifier 20 until pulse 45 has risen to a value equal to $E_{41}$. At this point the small portion at the peak of pulse 45 will exceed $E_{41}$, will appear on cathode 22, and be transmitted through capacitor 27 to grid 25 of amplifier 26. The voltage $E_{25}$ appearing on grid 25 of amplifier 26 is shown in Fig. 3(B). Because of the long time constant of capacitor 27 and resistor 46, the trailing edge of spill-over pulse 47 will endure for a long time and will not be completely terminated until it has reached a point 50 in Fig. 3(B). This small pulse will be amplified in amplifier 26 as illustrated in Fig. 3(C) wherein $E_{51}$ represents the voltage appearing on plate 51 of tube 26. Further amplification will take place in amplifier tube 30 as illustrated in Fig. 3(D) wherein $E_{52}$ represents the voltage appearing on plate 52 of amplifier 30.

The spill-over signal thus amplified is now ready for application to an integrating or energy storage circuit. In Fig. 2 a cathode follower 31 has been inserted after the last stage of amplification in order to provide a low impedance feeding source. The voltage appearing at the output 53 of cathode follower 31 is substantially equal to the voltage $E_{52}$ at the output of amplifier 30, and will be assumed to be the same. $E_{52}$ (Fig. 3(D)) is therefore applied through capacitor 54 to plate 55 of rectifier 32. In Fig. 3(D) dotted line 56 represents the substantially constant voltage existing on cathode 35 of rectifier 32 which thus constitutes a bias on the rectifier. Until pulse 57 has risen to a voltage equal to $E_0$, no signal will appear at cathode 35 of rectifier 32. When pulse 57 exceeds bias voltage $E_0$, current will flow from plate 55 to cathode 35, feeding energy into the RC circuit 33—34. Fig. 3(E) represents the voltage $E_{55}$ on plate 55 of rectifier 32. The shaded portion at the top of signal pulse 60 represents that portion of the voltage which spills over through rectifier 32.

In Fig. 3(F) the waveform $E_{35}$ represents the voltage appearing on cathode 35 of rectifier 32. Upon appearance of pulse 60 on plate 55, $E_{35}$ will rise with the peak of this pulse until point 61 is reached, at which the input pulse starts to decrease. However, the charge fed into capacitor 34 by the shaded portion of pulse 60 will decay very slowly along line 62 by virtue of the long time constant of energy storage circuit 33—34. The average value of the waveform $E_{35}$ constitutes $E_0$, the output voltage read in voltmeter 41. In order to obtain a low impedance feeder source, cathode follower 37 has been inserted between the storage circuit 33—34 and voltmeter 41. The voltage appearing on cathode 37 of tube 36 is substantially equal to $E_{35}$, as is well known for cathode followers; and the two voltages have been assumed to be the same for the illustrative purposes of Fig. 3.

In the Fig. 2 embodiment, cathode 37 of tube 36 has been given an initial positive bias by connection to point 40 on potentiometer 39. This is done simply to place the cathode follower in a proper operating region; it does not affect the operation of the circuit, inasmuch as the rectifier bias voltage is applied by means of conductors 42 and 43 directly from the voltmeter 41 to the two electrodes of rectifier 20.

The manner in which the output voltage $E_0$ rises upon increase of peak pulse voltage is also illustrated in Fig. 3 and will now be described.

As shown in Fig. 3(A), pulse 63 appreciably exceeds in peak value the bias voltage $E_{41}$. This spill-over voltage is stretched in the hereinbefore explained manner to produce pulse 64 of Fig. 3(B). This pulse is amplified in 26 as shown in Fig. 3(C) and is further amplified in 30 as shown in Fig. 3(D). Amplifier 30 is driven into saturation by pulse 64 so that the output $E_{52}$ is considerably lengthened as shown at 65 in Fig. 3(D). The spillover voltage, represented by the shaded portion of pulse 66 in Fig. 3(E), is thus not only of greater amplitude but of considerably greater duration than is the steadystate spill-over described in connection with pulse 60. Therefore, a considerably greater pulse of energy is fed through rectifier 32 to increase appreciably the charge on capacitor 34 of energy storage circuit 33—34, as shown at 67 in Fig. 3(F). This increased energy will raise the average level of the voltage across the energy storage circuit and will increase the reading of D. C. voltmeter 41.

Hence, when the next pulse 70 appears on terminal 23, the bias will have been appreciably increased so that only a small amount of signal will spill over. This voltage will also increase slightly the average value of the voltage on capacitor 34 as shown at 71 in Fig. 3(F). When pulse 72 is applied, steady state conditions have been resumed and only enough energy will spill through rectifier 32, as shown by the shaded peak of pulse 73 in Fig. 3(E), to maintain the voltage $E_{41}$ at the new steady state biasing voltage $E_0$.

The negative-going portions of $E_{55}$, 74 and 75 in Fig. 3(E), occur during the operation of the D. C. restorer portion 76 of rectifier 32, which prevents $E_{55}$ from remaining below ground potential.

In Fig. 2 have been illustrated certain switches 80, 81, and 82, each having positions A and B. When the circuit is used as a peak voltmeter as described above, the switches are in "A" position. When the switches are thrown to B position, the circuit may be used as a duty cycle meter, indicating the percentage time during which pulses exist on input terminal 23.

In Fig. 4 is shown a modification permitting use of the circuit of Fig. 2 for either positive or negative pulses, by the employment of switches 83 and 84, each having two positions C and D. Other elements of Fig. 4 bear the same reference numerals as in Fig. 2. With switches 83 and 84 in the D position, it will be manifest that the circuit is exactly the same as is shown in Fig. 2; and is, therefore, operative in response to positive pulses on terminal 23. With switches 83 and 84 in the C position, the circuit is responsive to negative pulses, the operation being the same as described in connection with Fig. 2, except that the polarity of the signals is reversed. Thus, at plate 55 of rectifier 32 there will appear a negative-going wave. This, however, will not affect cathode 35, and the potential $E_{55}$ will not drop appreciably below ground because of the action of D. C. restorer 76. When the negative pulse terminates by swinging positive, the spill-over voltage, of positive polarity, will be applied through rectifier 32 to the energy storage circuit 33—34 where the action will be substantially as described in connection with Fig. 2.

Fig. 5 illustrates an embodiment of this invention in which a cathode follower 90 is interposed between input terminal 91 and biased rectifier 92. This permits inclusion of a compensating variable capacitor 93 which may be adjusted to offset the capacitance inherent in rectifier 92—capacitance which might otherwise produce an error in the output reading. The correction introduced by capacitor 93 is particularly effective at high pulse repetition frequencies.

The operation of the corrective capacitor 93 will now be briefly described. A small pulse signal leaking through rectifier 92 by virtue of its inherent capacitance, and in spite of the bias voltage, may appear positively at terminal 94. However, amplifier action in tube 90 will produce a corresponding negative pulse at its anode 99. This pulse will be transmitted through capacitor 93 to point 94, and by proper setting of capacitor 93 the correction may be adjusted to offset exactly the error pulse translated through the capacitive action of rectifier 92. As in Fig. 2, the peak voltage is read in a D. C. voltmeter 95 after amplification in tube 96.

For certain applications it may be desirable to interchange the storage capacitor and the second rectifier. This is illustrated in the embodiment of Fig. 6 wherein rectifier 100 prevents leakage from the energy stored in capacitor 101, which slowly discharges through the RC circuit represented by resistance of voltmeter 102 and plate resistor 103. In the circuit of Fig. 6, point 104 is maintained negative with respect to ground by virtue of the polarizing action of rectifier 100.

From the above description it will be seen that there have been described circuits capable of deriving from a periodically repeated signal, a substantially constant voltage equal to either the positive or negative peak voltage of the signal. The operation of the circuits is substantially independent of frequency, duration, or waveform of the periodically repeated signal applied to the input terminals.

Although we have shown and described certain specific embodiments of the invention, we are fully aware of the many modifications possible thereof. This invention is not to be restricted except insofar as is necessitated by prior art and the spirit of the appended claims.

What is claimed is:
1. The method of measuring peak voltage of a pe- riodically repeated signal comprising applying the signal to a first biased rectifier, amplifying the output from the rectifier, applying the amplified output to an energy storage circuit comprising a second rectifier, applying a bias to the first rectifier of magnitude proportional to the voltage across the energy storage circuit and measuring the voltage across the energy storage circuit.

2. A peak voltmeter circuit for measuring peak voltage of a periodically repeated signal comprising a first biased rectifier, an amplifier effective to amplify the output from said first rectifier, a second rectifier effective to receive output from said amplifier, an energy storage circuit in which output from said amplifier may be stored after application to said second rectifier, and a circuit effective to apply a bias to said first rectifier of magnitude proportional to a voltage in said energy storage circuit.

3. A peak voltmeter circuit for measuring peak voltage of a periodically repeated signal comprising a threshold clipper, an amplifier effective to amplify the output from said threshold clipper, a rectifier effective to receive the output from said amplifier, an energy storage circuit in which the output from said amplifier is stored after application to said rectifier, and a circuit effective to apply a bias voltage to said threshold clipper of magnitude proportional to the voltage in said energy storage circuit.

4. A peak voltmeter circuit for measuring peak voltage of a periodically repeated signal comprising a threshold clipper, an amplifier effective to amplify the output from said threshold clipper, a rectifier effective to receive the output from said amplifier, and a circuit effective to apply a bias voltage to said threshold clipper of magnitude proportional to the output of said rectifier.

References Cited in the file of this patent

UNITED STATES PATENTS

| Number | Name | Date |
|---|---|---|
| 1,917,082 | Alexanderson | July 4, 1933 |
| 2,014,102 | Conklin | Sept. 10, 1935 |
| 2,148,718 | Agins | Feb. 28, 1939 |
| 2,162,239 | Beuermann | June 13, 1939 |
| 2,307,387 | Blumlein | Jan. 5, 1943 |
| 2,323,762 | George | July 6, 1943 |
| 2,341,280 | Ludbrook | Feb. 8, 1944 |
| 2,347,529 | Wheeler | Apr. 25, 1944 |
| 2,363,057 | Gaylord | Nov. 21, 1944 |
| 2,378,846 | Hansell | June 19, 1945 |
| 2,403,521 | Gilbert | July 9, 1946 |